(12) United States Patent
Border et al.

(10) Patent No.: US 6,642,295 B2
(45) Date of Patent: Nov. 4, 2003

(54) PHOTORESIST NANOCOMPOSITE OPTICAL PLASTIC ARTICLE AND METHOD OF MAKING SAME

(75) Inventors: John Border, Walworth, NY (US); Michael R. McGovern, Rochester, NY (US); Paul O. McLaughlin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/027,378

(22) Filed: Dec. 21, 2001

(65) Prior Publication Data

US 2003/0119962 A1 Jun. 26, 2003

(51) Int. Cl.$^7$ ................................................. C08L 3/20
(52) U.S. Cl. ........................ 524/437; 524/430; 524/433; 524/425
(58) Field of Search ..................... 524/430, 437, 524/433, 425

(56) References Cited

U.S. PATENT DOCUMENTS

| | | | |
|---|---|---|---|
| 3,915,924 A | 10/1975 | Wright | 260/375 B |
| 4,554,259 A * | 11/1985 | Franklin et al. | 501/67 |
| 5,470,910 A | 11/1995 | Spanhel et al. | 524/785 |
| 5,726,247 A | 3/1998 | Michalczyk et al. | 525/102 |
| 5,783,115 A | 7/1998 | Bilkadi et al. | 252/582 |
| 5,910,522 A | 6/1999 | Schmidt et al. | 523/168 |
| 6,020,419 A | 2/2000 | Bock et al. | 524/590 |
| 6,228,904 B1 | 5/2001 | Yadav et al. | 523/210 |
| 6,441,077 B1 * | 8/2002 | Border et al. | 524/433 |
| 6,498,208 B2 * | 12/2002 | Border et al. | 524/433 |
| 6,518,353 B2 * | 2/2003 | Border et al. | 524/560 |
| 2002/0119313 A1 * | 8/2002 | Border et al. | 428/402 |
| 2002/0123550 A1 * | 9/2002 | Border et al. | 524/425 |
| 2003/0031438 A1 * | 2/2003 | Kambe et al. | 385/122 |

FOREIGN PATENT DOCUMENTS

| | | | |
|---|---|---|---|
| EP | 1 099 963 A | 11/2000 | |
| EP | 1 099 963 A2 * | 5/2001 | G02B/5/18 |
| EP | 1 217 393 A | 12/2001 | |
| WO | WO 97/10527 | 3/1997 | |
| WO | WO 97/10527 A1 * | 3/1997 | G02C/7/04 |
| WO | WO 99/61383 | 12/1999 | |

OTHER PUBLICATIONS

Roy, D.; Basu, P. K.; Eswaran, S.V. Resonance 2002, 44–53.*

Shaw, J.M.; Gelorme, J.D.; LaBianca, N.C.; Conley, W.E.; Holmes, S.J. IBM Journal of Research and Development 1997, vol. 41, No. 1/2.*

Lucien Prod'homme, "A New Approach To The Thermal Change In The Refractive Index Of Glass" Physics and Chemistry of Glasses vol. 1 No. 4, Aug. 1960, pp. 119–122.

B. Braune, P. Muller, and H. Schmidt, "Tantalum Oxide Nanomers For Optical Applicatons" SPIE Conference on Organic–Inorganic Hybrid Materials for Photonics, San Diego, California, Jul. 1998, SPIE vol. 3469, 0277–786X/98, pp. 124–132.

C. Becker, P. Mueller, and H. Schmidt, "Optical And Thermomechanical Investigations On Thermoplastic Nanocomposites With Surface Modified Silica Nanoparticles" Part of the SPIE Conference on Organic–Inorganic Hybrid Materials for Photonics, San Diego, California, Jul. 1998, SPIE vol. 3469, 0277–786X/98, pp. 88–98.

* cited by examiner

*Primary Examiner*—David W. Wu
*Assistant Examiner*—Rip A. Lee
(74) *Attorney, Agent, or Firm*—Clyde E. Bailey, Sr.

(57) ABSTRACT

An optical nanocomposite material has a nanoparticulate filler dispersed in a polymeric host photoresist material. According to the method of making the nanocomposite material, a predetermined temperature sensitive optical vector, such as refractive index, of the plastic host material and nanoparticulate filler are directionally opposed resulting in a nanocomposite material having significantly improved stability of the refractive index with respect to temperature.

9 Claims, 5 Drawing Sheets

PHOTORESIST NANOCOMPOSITE OPTICAL PLASTIC ARTICLE AND METHOD OF MAKING SAME

CROSS-REFERENCE TO RELATED APPLICATIONS

The present application is related to U.S. application Ser. No. 09/747,706, filed Dec. 22, 2000, by Border, et al., and entitled, "Polycarbonate Nanocomposite Optical Plastic Article And Method Of Making Same"; U.S. application Ser. No. 09/748,634, filed Dec. 22, 2000 (allowed Feb. 24, 2003), by Border, et al., and entitled, "Polymethylmethacrylate Nanocomposite Optical Plastic Article And Method Of Making Same;" U.S. Pat. No. 6,522,111 issued Apr. 22, 2003 to Border, et al., and entitled, "Cyclic Olefin Polymeric Nanocomposite Optical Plastic Article And Method Of Making Same;" U.S. Pat. No. 6,498,208 issued Dec. 24, 2002 to Border, et al., and entitled, "Polystyrene Nanocomposite Optical Plastic Article And Method Of Making Same;" U.S. Pat. No. 6,518,353 issued Feb. 11, 2003 to Border, et al., and entitled, "Reduced Temperature Sensitive Polymeric Optical Article And Method Of Making Same;" U.S. Pat. No. 6,441,077 issued Aug. 27, 2002 to Border, et al., and entitled, "Polysulfone Nanocomposite Optical Plastic Article And Method Of Making Same."

FIELD OF THE INVENTION

The invention relates generally to the field of polymeric optical articles. More particularly, the invention concerns polymeric optical materials and small articles, such as plastic microlenses, that maintain stable performance characteristics over a broad temperature range.

BACKGROUND OF THE INVENTION

Plastic microlenses and glass microlenses often perform the same function in optical systems, such as in cameras, microscopes, and fiber optic devices. The two main attributes that separate plastic lenses from glass lenses are cost and optical stability. Plastic microlenses typically cost $1/10^{th}$ to $1/100^{th}$ the price of a similar glass microlens. On the other hand, the stability of the refractive index of a glass microlens with respect to temperature and humidity is typically 100 times better than that of a plastic microlens. Other reasons why a plastic microlens might be used over a glass microlens include: lower weight and higher impact resistance.

Microlenses represent a special case in the manufacturing of optical articles due to their very small size: from approximately 1 millimeter in diameter and often as small as 10 microns in diameter. While some microlenses can be manufactured by molding, in the case of extremely small microlenses, photolithographic techniques are often used. In photolithography, the difference in cost between plastic and glass microlenses is due largely to the difference in manufacturing processes that are required for the two materials. Glass microlenses and plastic microlenses for spherical lenses and aspheric lenses can be made using gray scale lithography. Stepped optics and some diffractives can also be made in glass and plastic using half tone lithography. In addition, plastic microlenses can be made using modulated laser writing for spherical lenses and aspheric lenses as well as ink jet or printed lithography for spherical lenses by a reflow technique. In all of these exposure techniques, both laser beam and UV radiation sources can be used. Of all the manufacturing techniques, gray scale lithography is the most expensive since it requires the use of a very expensive gray scale photomask ($30,000 typical) along with an iterative definition of the exposure process to get the desired surface profiles or optical curves. The other manufacturing techniques available for making plastic microlenses are all much less expensive because the gray scale mask is not required so that the overall production costs are much less for plastic microlenses made from photoresist than glass microlenses.

In contrast, the difference in optical stability between plastic and glass is due to differences in their basic material properties. This difference in optical stability results in substantially more variation in focus and light loss in articles such as fiber optic devices when plastic microlenses are used in place of glass microlenses. What is desired, and is a remaining challenge in the art, is a material with the optical stability of glass that processes like a plastic. While some optical plastic materials such as cyclic olefins greatly improve the refractive index stability with respect to humidity, improving the refractive index stability of plastics with respect to temperature has remained an opportunity.

A study on the competing fundamental material characteristics that determine the sign and the magnitude of the dn/dT of glasses is available, for instance, by Lucien Prod'homme, "A new approach to the thermal change in the refractive index of glasses," Physics and Chemistry of Glasses, Vol. 1, No. 4, August 1960. The two competing effects that determine the dn/dT in glasses are the density change which produces a negative dn/dT and the electronic polarizability which produces a positive dn/dT. The net dn/dT in a glass material depends on which effect dominates. In optical plastics however, there is not an electronic polarizability so that all unfilled plastic materials have negative dn/dT values. None the less, the article by Prod'homme does identify the possibility of using glass-like fillers with positive dn/dT values to substantially alter the dn/dT of a filled plastic composite material.

Nanoparticulate fillers have been used to modify the index of refraction of optical plastics. By using a filler small enough that it is well below the wavelength of visible light (400–700 nm), the filler will not scatter the light and the filled plastic can retain its transparency. WIPO Patent WO97/10527 describes the use of nanoparticles to increase the refractive index of plastics for opthalmic applications. In addition, technical references that describe the addition of nanoparticles to increase the refractive index of plastics include: C. Becker, P Mueller, H. Schmidt; "Optical and Thermomechanical Investigations on Thermoplastic Nanocomposites with Surface-Modified Silica Nanoparticles," SPIE Proceedings Vol. 3469, pp. 88–98, July 1998; and, B. Braune, P. Mueller, H. Schmidt; "Tantalum Oxide Nanomers for Optical Applications," SPIE Proceedings Vol 3469, pp. 124–132, July 1998. While these references disclose the use of nanoparticles to modify refractive index of optical plastics they do not discuss the issue of refractive index stability with respect to temperature which requires a different set of characteristics in the nanoparticle.

U.S. Pat. No. 6,020,419 issued to M. Bock, et al., discloses the use of nanoparticulate fillers in a resin based coating for improved scratch resistance. U.S. Pat. No. 5,726,247 issued to M. Michalczyk, et al., also describes a protective coating that incorporates inorganic nanoparticles into a fluoropolymer. While scratch resistance is important in plastic optics, the nanoparticles that would be suitable for scratch resistance would be very different from those with the specific properties needed to improve refractive index stability with respect to temperature.

U.S. Pat. No. 3,915,924 issued to J. H. Wright describes a nanoparticulate filled clear material for filling voids. U.S.

Pat. No. 5,910,522 issued to H. Schmidt, et al., describes an adhesive for optical elements that includes nanoscale inorganic particles to reduce thermal expansion and improved structural properties at elevated temperatures. While the inventions described in these patents represents some progress in the art, none of them address specific optical properties of the modified plastic material particularly as these properties relate to temperature sensitivity.

WIPO Patent WO9961383A1 discloses a method for producing multilayered optical systems that uses at least one layer that contains nanoparticulate fillers to form a layer with a different refractive index than the substrate to create an interference filter or an antireflection layer. Obviously, this patent is addressing another form of modification of the index of refraction and such is not concerned with the stability of the index of refraction with respect to temperature.

Skilled artisans will appreciate that a wide variety of materials are available in nanometer particle sizes that are well below the wavelength of visible light. Representative materials may be acquired from companies such as Nanophase Technologies Corporation (1319 Marquette Drive, Romeoville, Ill. 60466) and Nanomaterials Research Corporation (2620 Trade Center Avenue, Longmont, Colo. 80503). By selecting nanoparticle materials based on properties other than index of refraction, our experience indicates that it is now possible to modify other optical properties of plastics.

While there have been several attempts to modify properties of plastics using nanoparticles, none of these attempts have proven successful in producing optical plastic articles with temperature stable optical properties while retaining important processing characteristics.

Therefore, a need persists in the art for optical plastic articles, such as microlenses, and a method of making same that have temperature stable optical properties.

SUMMARY OF THE INVENTION

It is, therefore, an object of the invention to provide an optical nanocomposite material that has reduced temperature sensitivity.

Another object of the invention is to provide an optical article, such as a plastic microlens, that maintains stability over a broad range of temperatures.

Yet another object of the invention is to provide a method of manufacturing an optical article having reduced temperature sensitivity.

It is a feature of the optical article of the invention that a select nanoparticulate is dispersed into a plastic photoresist host material having a temperature sensitive optical vector that is directionally opposed to the temperature sensitive optical vector of the nanoparticulate filler.

To accomplish these and other objects, features and advantages of the invention, there is provided, in one aspect of the invention, a photoresist nanocomposite optical plastic article comprising: a photoresist host material having a temperature sensitive optical vector $x_1$ and substantially transparent inorganic nanoparticles having a size less than 40 nm dispersed in the photoresist host material having a temperature sensitive optical vector $x_2$, wherein the temperature sensitive optical vector $x_1$ is directionally opposed to temperature sensitive optical vector $x_2$ In another aspect of the invention, there is provided a method of manufacturing a photoresist nanocomposite optical plastic article, comprising the steps of:

(a) providing a photoresist host material having a temperature sensitive optical vector $x_1$ and substantially transparent inorganic nanoparticles having a temperature sensitive optical vector $x_2$, wherein temperature sensitive optical vector $x_1$ is directionally opposed to temperature sensitive optical vector $x_2$;

(b) dispersing the substantially transparent inorganic nanoparticles into the photoresist host material forming a photoresist nanocomposite material; and, (c) forming the photoresist nanocomposite material into the photoresist optical plastic article.

Hence, the present invention has numerous advantageous effects over existing developments, including: (1) the resulting nanocomposite has a significantly lower dn/dT (change in refractive index with temperature); (2) microlenses made with the nanocomposite material have more stable focal length over a given temperature range; (3) low levels of dn/dT are achievable in the nanocomposite material with reduced loading of the nanoparticulate; (4) the viscosity of the nanocomposite material is not significantly higher than the base plastic so that conventional plastic processing techniques can be used; and, (5) the nanocomposite material has improved barrier properties so that the change of refractive index with respect to humidity will be reduced compared to the base plastic.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
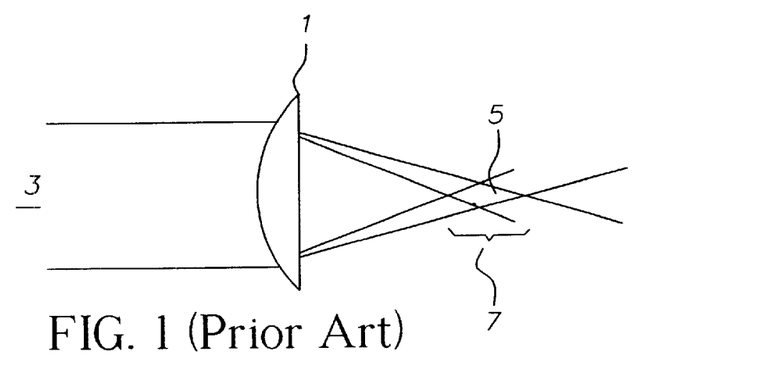
FIG. 1 is a plastic lens showing a range of focal length variation produced by a change in temperature and the resulting change in refractive index.

Referring first to FIG. 1, it is well known that in a typical prior art lens 1, focal length varies significantly with changes in temperature (T). The relationship between focal length and refractive index is given by the below equation:

$$f=R/(n-1);\qquad\text{(Equation 1)}$$

wherein (f) is the focal length of the lens 1 produced as incident light 3 goes through the lens 1 and is focused at focal point 5, (R) is the radius of the lens surface, and (n) is the refractive index of the lens material.

In the case of a fiber optic device located outdoors (not shown), the temperature range of operation can easily be 50° C. between summer heat and winter cold. As an example, a lens 1 having a 10 mm radius and made, for instance, of polymethylmethacrylate, the index of refraction (n) at room temperature is 1.492 and the focal length (calculated from Equation 1 above) is 20.325 mm.

In a typical prior art lens 1 comprising a plastic material selected from Table I, the change in refractive index (dn) over the temperature range of operation is 0.0055 and the change in focal point 5 shown as the change in focal length 7 (FIG. 1) of the lens from Equation 1 is 0.229 or 1.1%. Skilled artisans will appreciate that the light loss associated with this change in focal length will be significant over the temperature range mentioned.

Figure 2A:
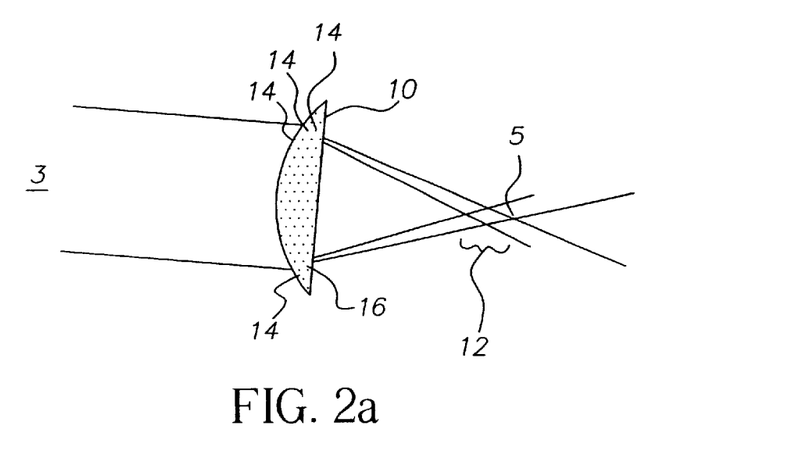
FIG. 2*a* shows a lens made from a nanocomposite material that has improved stability of refractive index with respect to temperature and an associated reduced range of focal length variation produced by a change in temperature.

Turning now to FIG. 2a, the reduced temperature sensitive, nanocomposite optical article or lens 10 of the invention is illustrated. According to FIG. 2a, the nanocomposite optical article or lens 10 is composed of a polymeric host photoresist material 16 and a select nanoparticulate material 14 dispersed in the plastic host material 16. Polymeric host photoresist material 16 may be either a thermoplastic or thermoset material. It is important to the invention that the polymeric host photoresist material 16 be selected based on a predetermined temperature sensitive optical vector $x_1$, for instance refractive index n. Similarly, the selection of the nanoparticulate material 14 dispersed in the polymeric host photoresist material 16 must be based on a corresponding predetermined temperature sensitive optical vector $x_2$, specifically refractive index. In this case, temperature sensitive optical vectors $x_1$ and $x_2$ are defined by a change in refractive index (dn) of the polymeric host photoresist material 16 and the nanoparticulate material 14, respectively, with respect to a change in temperature (dT). It is further important to our invention that $x_1$ is directionally opposed to $x_2$. By carefully selecting a nanoparticulate material 14 having a dn/dT, i.e., a rate of change of refractive index with respect to temperature, that has a sign that is directionally opposed to the dn/dT of the polymeric host photoresist material 16, it is possible to significantly reduce the dn/dT of the resulting nanocomposite material at relatively low loadings of the nanoparticulate material 14. As a result, the viscosity of the nanocomposite material is not drastically increased and the processing characteristics will be similar to other optical plastics. Consequently, the resulting optical nanocomposite lens 10 has a focal length range 12 (FIG. 2a) over the operating temperature range that is much less than that exhibited by the prior art lens 1 shown in FIG. 1. According to Tables I and II, several select dn/dT values for polymeric host materials (plastics) and inorganic nanoparticulate fillers that comprise the nanocomposite material of the invention are illustrated (Kodak KTFR™ photoresist can be obtained at The Cronite Company, 120 East Halsey Rd, Parsippany, N.J. 07054; Olin photoresists can be obtained from Microchem Corporation, 1254 Chestnut Street, Newton, Mass. 02464-1418).

TABLE 1

Approximate dn/dT for Various Optical Plastics

| Plastic | dn/dT ($10^{-6}$/° C.) |
|---|---|
| Polymethylmethacrylate | −105 |
| Polystyrene | −127 |

TABLE 1-continued

Approximate dn/dT for Various Optical Plastics

| Plastic | dn/dT ($10^{-6}$/° C.) |
|---|---|
| Polycarbonate | −114 |
| Polystyrene | −110 |
| Cyclic olefin copolymer | −102 |
| Cyclic olefin homopolymer | −110 |
| Polysulfone | −100 |
| Kodak KTFR Photoresist (liquid) | −436 |
| Olin HIPR 6505 Photoresist (liquid) | −230 |
| Olin HIPR 6512 Photoresist (liquid) | −268 |

TABLE 2

Approximate dn/dT for Various Inorganic Materials with Transmission Bands in Visible Wavelengths

| Material | dn/dT ($10^{-6}$/° C.) |
|---|---|
| Barium fluoride | −16 |
| Aluminum oxide | 14 |
| ALON | 12 |
| Berryllium oxide | 10 |
| BBO | −16 |
| Diamond | 10 |
| Calcium carbonate | 7 |
| Calcium fluoride | −10 |
| Cesium bromide | −85 |
| Cesium iodide | −99 |
| Potassium bromide | −42 |
| Potassium chloride | −36 |
| Potassium fluoride | −23 |
| Potassium iodide | −45 |
| Potassium titano phosphate | 12 |
| Lithium borate | −7 |
| Lithium fluoride | −17 |
| Lithium iodate | −80 |
| Magnesium aluminate | 9 |
| Magnesium oxide | 19 |
| Sodium bromide | −40 |
| Sodium chloride | −35 |
| Sodium fluoride | −13 |
| Sodium iodide | −50 |
| Silicon oxide | −5 |
| Quartz | 12 |
| Tellurium oxide | 9 |
| Titanium dioxide | −1 |
| Yttrium oxide | 8 |
| Zinc Sulfide | 49 |

Figure 2B:
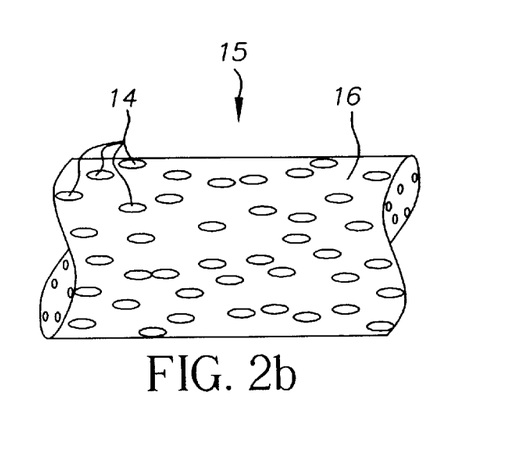
FIG. 2*b* shows a representative view of the nanoparticles uniformly dispersed in the photoresist nanocomposite material.

In addition to the polymeric host photoresist material 16 and the nanoparticulate material 14 having directionally opposed dn/dT, the invention contemplates other qualifications for the nanoparticulate material to make the useful, novel, and unobvious optical nanocomposite material of the invention. For instance, the nanoparticulate material 14 must be transparent in the wavelength region of interest to maintain high optical transmission levels. Moreover, the nanoparticulate must be available in a particle size range that is less than 40 nm to avoid scattering light. Most preferred is a particle size range below 20 nm. Further, it must be possible to disperse the nanoparticles into the polymeric host photoresist material 16 such that no significant amounts of agglomerates and/or voids larger than 40 nm occur which would scatter light. FIG. 2b shows a representative view 15 of the nanoparticles 14 dispersed into the polymeric host photoresist material 16. The nanoparticles 14 are shown dispersed evenly throughout the polymeric host photoresist material 16. The nanoparticles 14 do not have any larger agglomerates or voids associated with them. Furthermore, the cost of the nanoparticulate and any associated surface treatments of the nanoparticles to improve compatibility and dispersibility must be low enough that the total cost of the optical article is significantly less than a glass article.

As illustrated in Tables I and II, there exists a number of inorganic materials that have dn/dT values with an opposite sign compared to polymeric materials. Thus, a nanocomposite material 15 with significantly improved refractive index stability with respect to temperature can be formulated by dispersing a select nanoparticulate material 14 into a polymeric host photoresist material 16 that have directionally opposed (or opposite signs) dn/dT.

According to another aspect of the invention, a method of manufacturing a reduced temperature sensitive optical article or lens 10 (as described above) includes the step of selecting a polymeric host photoresist material 16, such as one described in Table 1. According to the invention, the selected polymeric host photoresist material 16 has a temperature sensitive optical vector $x_1$ or dn/dT, as described above. A nanoparticulate material 14 (Table II) is selected for dispersing in the polymeric host photoresist material 16. The select nanoparticulate material 14, according to the invention, is required to have a compatible corresponding temperature sensitive optical vector $x_2$. Moreover, it is further important to the invention that $x_1$ is directionally opposed to $x_2$, i.e., one of the two must be negative and the other positive. Once the nanoparticulate material is selected, it is then dispersed in the polymeric host photoresist material 16 using suitable dispersion techniques, such as compounding, solvent dispersion, or in situ making. Once the nanoparticulate material 14 is dispersed into the polymeric host photoresist material 16, a nanocomposite material is formed. The nanocomposite material can then be used to form an array of optical articles such as the lens 10 of the invention having reduced temperature sensitivity.

Figure 3:
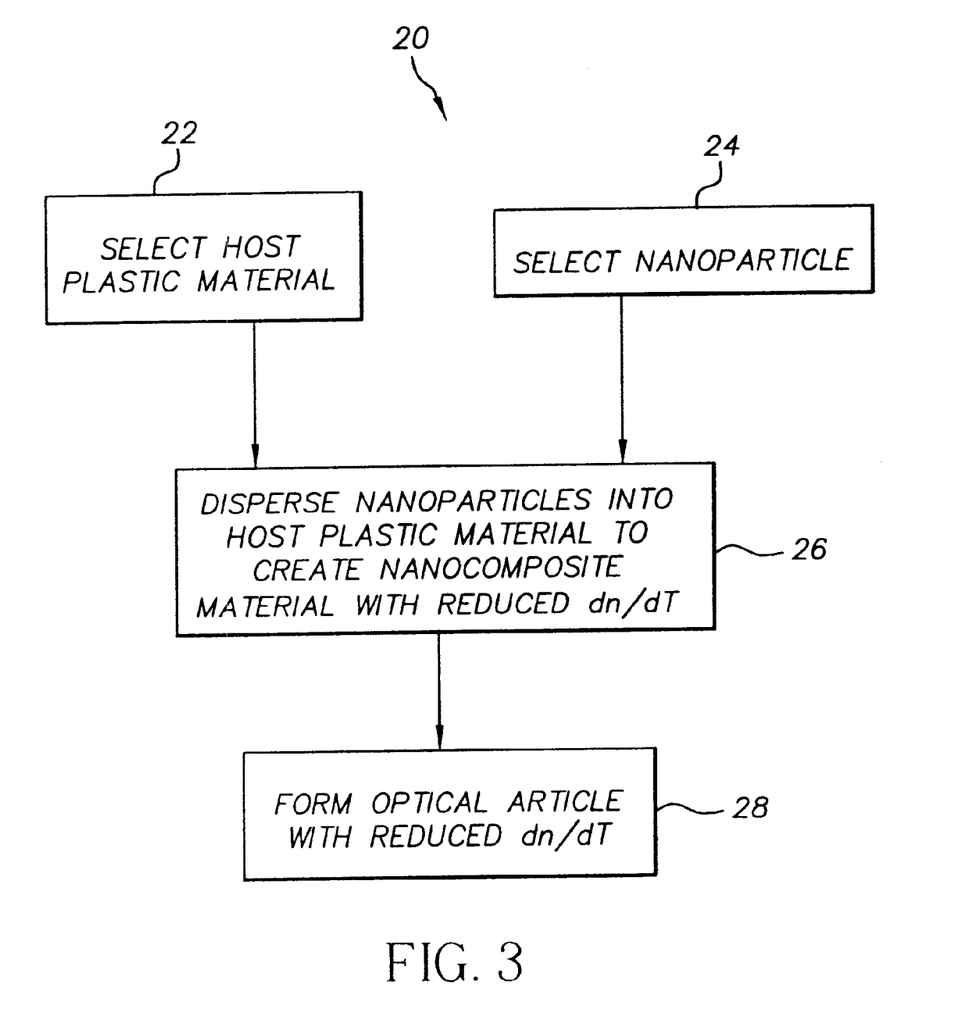
FIG. 3 is a block diagram of the process for manufacturing a plastic optical article with improved refractive index stability.

Referring to FIG. 3, a diagram of the method 20 for making the reduced dn/dT nanocomposite material for optical articles, such as lens 10, is depicted. First the polymeric host photoresist material is selected 22 based on optical, structural, and thermal design considerations such as % transmission, % haze, index of refraction, yield strength at a temperature, moisture absorption, impact strength, scratch resistance, glass transition temperature, etc. Second, the nanoparticulate material is preferably selected 24 based on dn/dT, transparency in the wavelength region of interest, particle size, cost, and availability. As disclosed in this invention, selecting suitable nanoparticulate materials 24 requires selecting materials having a dn/dT that has a sign that is opposite to the polymeric host photoresist material being used and an average particle size less than about 40 nm. Third, the nanoparticles are preferably dispersed 26 into the polymeric host photoresist material although other mixing processes could be used, such as roll milling. Dispersion 26 can be accomplished through compounding (refer to FIG. 4) solvent dispersion (refer to FIG. 5) or in situ making (refer to FIG. 6) of the nanoparticulates with good results. Fourth, the nanoparticulate filled photoresist material is formed into an optical article 28 or lens 10 of the invention by using photolithographic techniques.

Figure 4:
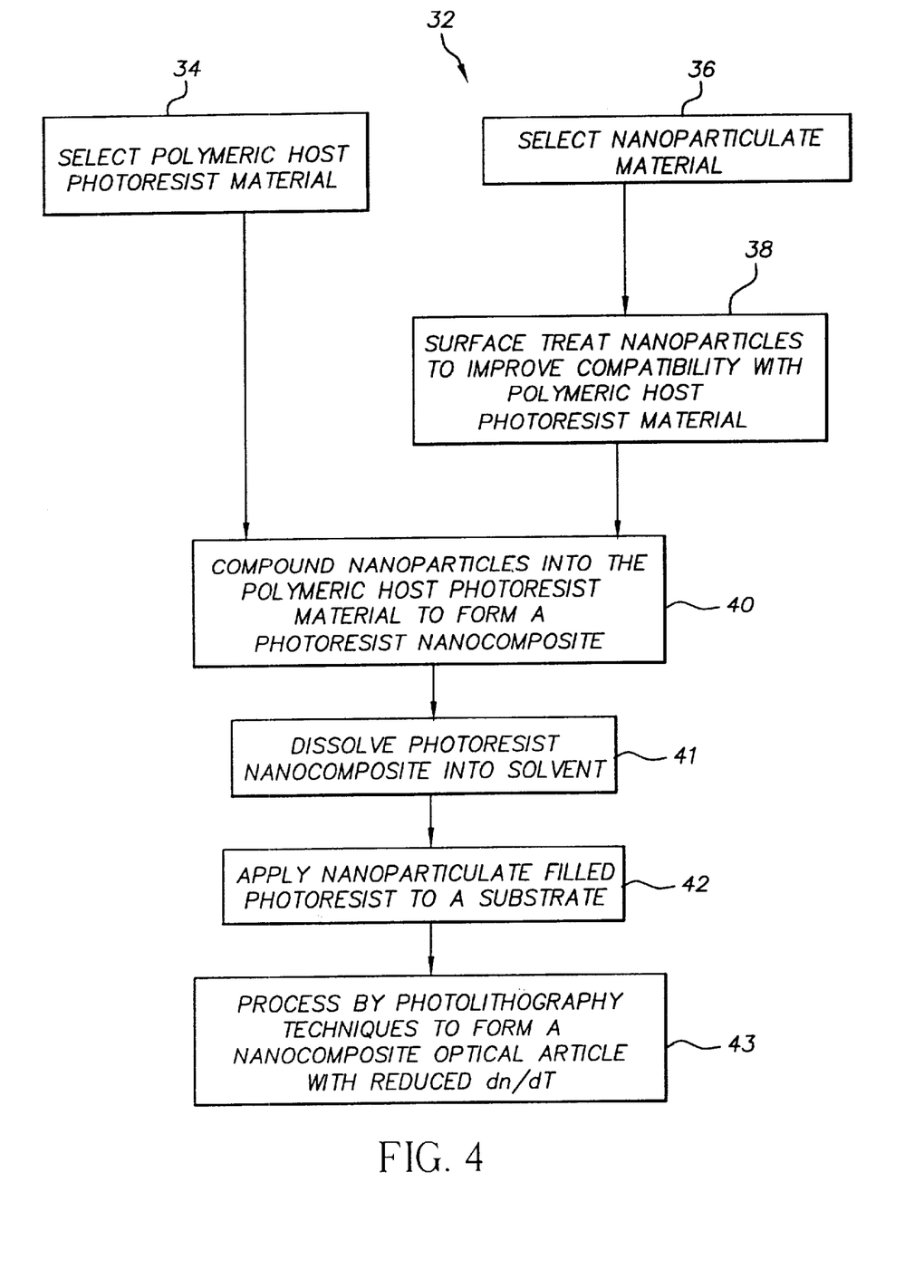
FIG. 4 is a block diagram of a process for making a photoresist nanocomposite optical article using a compounded dispersion approach.
Figure 5:
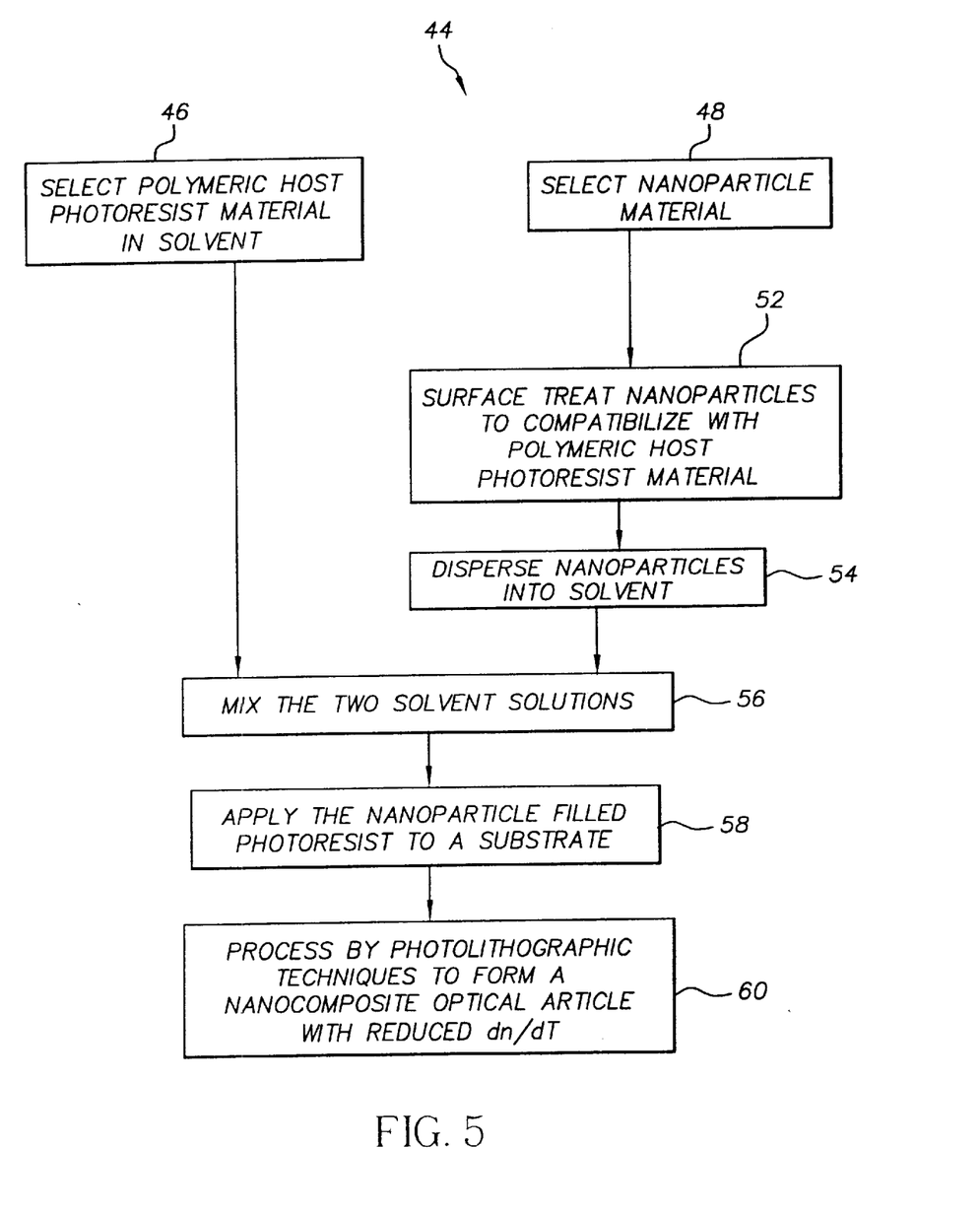
FIG. 5 is a block diagram of a process for making a photoresist nanocomposite optical article using a solvent dispersion based approach; and, FIG. 6 is a block diagram of a process for making a photoresist nanocomposite optical article using an in situ formation of the nanoparticulates
Figure 6:
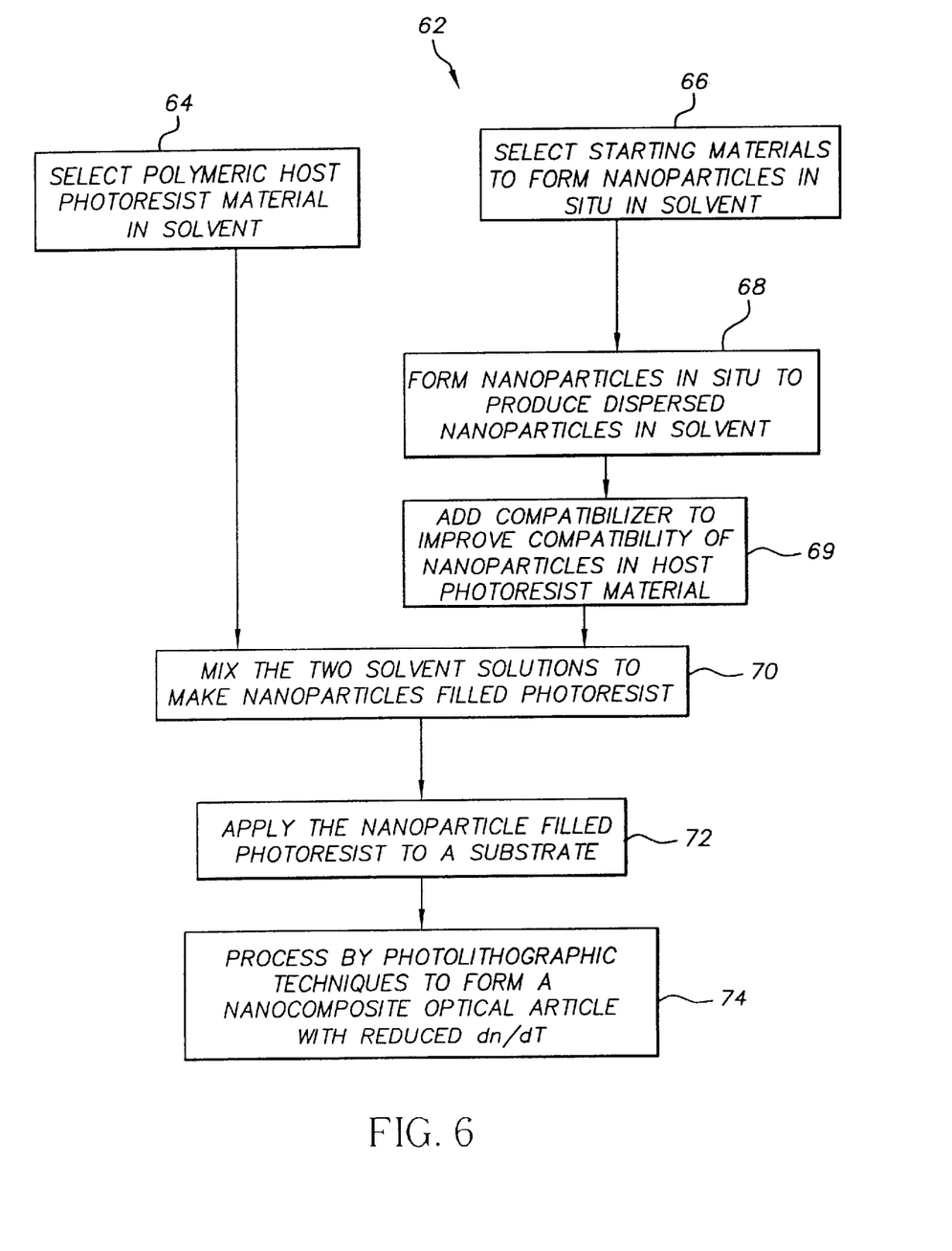

Referring to FIGS. 4, 5 and 6, three methods of dispersing the nanoparticles into the polymeric host photoresist material are schematically illustrated. According to FIG. 4, an outline of the process for dispersion through compounding 32 is depicted. In compounding 32, the selected nanoparticles 36 are fed into a compounder 40, such as a twin screw extruder or a Farrell continuous mixer, along with pellets of the selected polymeric host photoresist material 34. After compounding 40, the nanoparticle filled photoresist material is dissolved in solvent 41. The photoresist is then applied to a substrate 42 and then processed using photolithographic techniques 43.

As shown in FIGS. 4, 5, and 6, a surface treatment 38 and 52 or compatibilizer 69, respectively, may be needed to make the nanoparticles 36, 48 and 66 compatible with the host materials 34, 46, and 64. Skilled artisans will appreciate that this treatment could be applied to the nanoparticles 36, 48 and 66 directly or added as an additive to the compounder 40 along with the nanoparticles 36 and the host material 34, or alternately the treatment could be added to the solvent 54 or 68.

According to FIG. 5, in the solvent-based dispersion process 44, the selected polymeric host photoresist material 46 is supplied in a solvent, whereas the selected nanoparticles 48 must be dispersed in solvent 54, prior to mixing the two solvent solutions 56. The selected nanoparticles 48 are preferably exposed to an intermediate solvent dispersion step 54 to insure that a good dispersion is obtained and all agglomerates are broken up. After mixing the two solvent solutions together in step 56, the nanoparticle filled photoresist material is applied to a substrate 58 and then processed using a photolithographic technique to form a nanocomposite optical article 60 with reduced temperature sensitivity.

In FIG. 6, an in situ based making approach 62 is outlined schematically. In the in situ making approach the nanoparticles are formed in a solvent solution 68 so that they are fully dispersed as formed. The solvent solution with the nanoparticulates is then mixed with the host photoresist material 70 which is supplied in a solvent solution. The nanoparticle filled resist composed of solvent solution 68 and the host photoresist material 70 is then coated 72 onto the substrate 58. A nanocomposite optical article is then formed using photolithographic techniques 74.

Following all 3 techniques for making the optically modified photoresist material, the end result is a photoresist nanocomposite material which contains fully dispersed nanoparticles such as shown in FIG. 2b with the nanoparticles being present in sufficient quantity to deliver the reduced dn/dT desired.

Photolithographic techniques 43, 60 and 74 for forming the optical article include but are not limited to: modulated laser writing, gray scale lithography, and half tone lithography as accomplished with laser beam radiation, UV radiation, IR radiation, Xray radiation, or visible radiation.

In a preferred embodiment, the nanocomposite optical article of manufacture 10 is comprised of a polymeric photoresist host material selected from the group consisting of positive or negative photoresists including but not limited to: acrylic, epoxy, polyimide, polystyrene, polyisoprene, phenolic, phenol formaldehyde copolymer, acetoxystyrene, and fluoropolymers. The nanoparticle filled photoresists can be in the form of solvent based liquids or in the form of sheets of nanoparticle filled photoresist.

Typically the reduced dn/dT article of manufacture 10 produced within the contemplation of the invention are single lenses, arrays of lenses, both refractive and diffractive lenses, optical coatings, microlenses, window glazing, fiber optics, microlenses on fiber optics, cover glasses for digital imagers, microlenses on digital imagers, and other optical devices of the like.

Skilled artisans will appreciate that modification of the optical properties of the host material is achieved, in accordance with the method of the invention, by reducing the dn/dT of the nanocomposite material. In our preferred embodiment, this is achieved by dispersing a nanoparticulate material filler having a dn/dT with a sign that is opposite that of the base plastic.

EXAMPLE 1

An exemplary example of the aforementioned procedure for reducing the dn/dT of an optical plastic follows.

Polymethylmethacrylate nanocomposite optical plastic comprises a polymethylmethacrylate host material having a temperature sensitive optical vector $x_1$ and magnesium oxide nanoparticles having a temperature sensitive optical vector $x_2$ dispersed in the polymethylmethacrylate host material. According to the requirements of the invention, $x_1$ is directionally opposed to $x_2$.

More particularly, a polymethylmethacrylate host material is optically modified with the addition of magnesium oxide nanoparticles. Polymethylmethacrylate has a dn/dT of approximately −105E-6/° C. as shown in Table 1. Magnesium oxide has a dn/dT of approximately +19E-6/° C. Magnesium oxide nanoparticles are available from Nano Materials Research (Romeoville, Ill.) in the 10 nm size. Magnesium oxide is transparent in the region 0.35–6.8 micron which includes the visible light region. The volume (%) of magnesium oxide nanoparticles required in the polymethylmethacrylate host material to reduce the dn/dT by 50% can be calculated based on volume using Equation 2, below.

$$v_{50} = 0.5(\gamma_p/\gamma_p - \gamma_n) \quad \text{(Equation 2)}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of polymethylmethacrylate and magnesium oxide, the volume (%) of nanoparticles needed to reduce the dn/dT of the nanocomposite by 50% compared to the dn/dT of the polymethylmethacrylate is approximately 42%.

Referring to FIG. 4, magnesium oxide nanoparticles were compounded into polymethylmethacrylate. In this case, a compatibilizer additive, Solsperse 21000 from Avecia Pigments and Additives (8720 Red Oak Blvd., Suite 227, Charlotte, N.C. 28217) at 10% by weight of the nanoparticles was mixed in with the polymethylmethacrylate pellets to aid in dispersing the magnesium oxide nanoparticles. Compounding was done in a twin screw extruder. Lenses were then molded from the pellets produced from compounding. The resulting dispersion of the nanoparticles in the lenses was quite good when examined under the scanning electron microscope.

EXAMPLE 2

Alternatively, the nanocomposite material above was prepared using a solvent based dispersion process as shown schematically in FIG. 5, with toluene or xylene. The solvent based dispersion process has been successful for a wide variety of polymers (polymethylmethacrylate, polystyrene, polycarbonate, and cyclic olefin) as well as a variety of nanoparticles (titanium dioxide, magnesium oxide, and zinc oxide). The dispersion of the nanoparticles is accomplished in a mill to break up the agglomerates. As a result, well-dispersed solutions have been produced which are suitable for mixing with photoresists that are based on compatible solvents. The resulting nanoparticulate filled photoresist will form a nanocomposite when coated onto a substrate and then processed using photolithography techniques, the nanocomposite produced will have a reduced dn/dT.

EXAMPLE 3

In another case, a polycarbonate host material is optically modified with the addition of aluminum oxide nanoparticles. Polycarbonate has a dn/dT of approximately −14E-6/° C. as shown in Table 1. Aluminum oxide has a dn/dT of approximately +14E-6/° C. Aluminum oxide nanoparticles are available from Kemco International Associates (25935 Detroit Road #333, Westlake, Ohio 44145) in the 37 nm size. Aluminum oxide is transparent in the region 0.19–5.0 micron which includes the visible light region. The volume (%) of aluminum oxide nanoparticles required in the polycarbonate host material to reduce the dn/dT by 50% can be calculated based on volume using Equation 2, below.

$$v_{50} = 0.5(\gamma_p/\gamma_p - \gamma_n) \quad \text{(Equation 2)}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of polycarbonate and aluminum oxide, the volume (%) of nanoparticles needed to reduce the dn/dT of the nanocomposite by 50% compared to the dn/dT of the polycarbonate is approximately 45%.

EXAMPLE 4

In another case, a polystyrene host material is optically modified with the addition of aluminum oxide nanoparticles. Polystyrene has a dn/dT of approximately −127E-6/° C. as shown in Table 1. Aluminum oxide has a dn/dT of approximately +14E-6/° C. Aluminum oxide nanoparticles are available from Kemco International Associates in the 37 nm size. Aluminum oxide is transparent in the region 0.19–5.0 micron which includes the visible light region. The volume (%) of aluminum oxide nanoparticles required in the polycarbonate host material to reduce the dn/dT by 50% can be calculated based on volume using Equation 2, below.

$$v_{50} = 0.5(\gamma_p/\gamma_p - \gamma_n) \quad \text{(Equation 2)}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of polycarbonate and aluminum oxide, the volume (%) of nanoparticles needed to reduce the dn/dT of the nanocomposite by 50% compared to the dn/dT of the polycarbonate is approximately 45%.

EXAMPLE 5

In another case, a cyclic olefin homopolymer host material is optically modified with the addition of magnesium oxide nanoparticles. Cyclic olefin homopolymer has a dn/dT of approximately −110E-6/° C. as shown in Table 1. Magnesium oxide has a dn/dT of approximately +14E-6/° C. Magnesium oxide nanoparticles are available from Nano Materials Research in the 10 nm size. Magnesium oxide is transparent in the region 0.35–6.8 micron which includes the visible light region. The volume (%) of magnesium oxide nanoparticles required in the cyclic olefin homopolymer host material to reduce the dn/dT by 50% can be calculated based on volume using Equation 2, below.

$$v_{50} = 0.5(\gamma_p/\gamma_p - \gamma_n) \quad \text{(Equation 2)}$$

Wherein, $v_{50}$ is the volume % of the nanoparticles needed to reduce the dn/dT of the nanocomposite by 50% compared to the host plastic; $\gamma_p$ is the dn/dT of the host plastic (See FIG. 1); $\gamma_n$ is the dn/dT of the nanoparticle material.

For the combination of cyclic olefin homopolymer and magnesium oxide, the volume (%) of nanoparticles needed to reduce the dn/dT of the nanocomposite by 50% compared to the dn/dT of the cyclic olefin homopolymer is approximately 43%.

The invention has therefore been described with reference to a preferred embodiment thereof. However, it will be appreciated that variations and modifications can be effected by a person of ordinary skill in the art without departing from the scope of the invention.

PARTS LIST:

1 prior art lens
3 incident light
5 focal point of the lens
7 range of change of the focal length produced by a change in temperature of the plastic lens
10 nanocomposite lens
12 reduced range of change of the focal length produced by a change in temperature of the nanocomposite lens
14 dispersed nanoparticulate material
15 representation of nanoparticles dispersed into the host plastic material
16 polymeric host photoresist material
20 schematic of method for making reduced dn/dT article
22 step of selecting host material
24 step of selecting the nanoparticulate material
26 step of dispersion
28 step of forming an optical article
32 compounding process
34 step of selecting host photoresist material
36 step of selecting nanoparticulate material
38 step of surface treating nanoparticles
40 step of compounding nanoparticles
41 step of dissolving compounded material
42 step of applying the photoresist to a substrate
43 step of processing the nanoparticle filled photoresist to form a nanocomposite optical article
44 solvent-based dispersion process
46 step of selecting polymeric host photoresist material
48 step of selecting nanoparticles
52 step of surface treating nanoparticles
54 step of dispersing nanoparticles in solvent
56 step of mixing together products of steps 46 and 54
58 step of applying the nanoparticle filled photoresist to a substrate
60 step of processing the nanoparticle filled photoresist to form a nanocomposite optical article
62 in situ based process for forming nanoparticle dispersion that is mixed with photoresist
64 step of selecting host photoresist material
66 step of selecting starting materials for forming nanoparticles in situ in a solvent
68 step of forming the nanoparticles in situ in a solvent dispersion
69 step of adding compatibilizer to nanoparticulate dispersion
70 step of mixing the photoresist solution to the nanoparticle dispersion
72 step of applying the nanoparticle filled photoresist to a substrate
74 step of processing the nanoparticle filled photoresist to form a nanocomposite optical article

What is claimed is:

1. Photoresist nanocomposite optical plastic article, comprises: a photoresist host material having a temperature sensitive optical vector $x_1$ and substantially transparent inorganic nanoparticles having a size less than 40 nm dispersed in said photoresist host material having a temperature sensitive optical vector $x_2$, wherein said temperature sensitive optical vector $x_1$ is directionally opposed to said temperature sensitive optical vector $x_2$.

2. The photoresist nanocomposite optical plastic article recited in claim 1 wherein each of said temperature sensitive optical vectors $x_1$ and $x_2$ are defined by a change in refractive index (dn) of said photoresist host material and said substantially transparent inorganic nanoparticles, respectively, with respect to a change in temperature (dT).

3. The photoresist nanocomposite optical plastic article recited in claim 1 wherein said temperature sensitive optical vector $x_1$ has a value of $-100 \times 10^6/°$ C. to $-500 \times 10^6/°$ C. and said temperature sensitive optical vector $X_2$ has a value in the range of about $+6 \times 10^{-6}/°$ C. to about $+50 \times 10^{-6}/°$ C.

4. The photoresist nanocomposite optical plastic article recited in claim 1 wherein said substantially transparent inorganic nanoparticles are magnesium oxide.

5. The photoresist nanocomposite optical plastic article recited in claim 1 wherein said substantially transparent inorganic nanoparticles are aluminum oxide.

6. The photoresist nanocomposite optical plastic article recited in claim 1 wherein said substantially transparent inorganic nanoparticles are calcium carbonate.

7. The photoresist nanocomposite optical plastic article recited in claim 4 wherein said photoresist host material comprises a predetermined volume (%) of said magnesium oxide nanoparticles to reduce said temperature sensitive optical vector $x_1$ by about 50%, said predetermined volume being determined by the equation:

$$v_{50}=0.5(\gamma_p/\gamma_p-\gamma_n);$$

wherein $v_{50}$ is the volume % of said magnesium oxide nanoparticles needed to reduce the dn/dT of said photoresist nanocomposite optical plastic article by 50% compared to said photoresist host material; $\gamma_p$ is the dn/dT of said photoresist host material; and $\gamma_n$ is the dn/dT of said magnesium oxide nanoparticles.

8. The photoresist nanocomposite optical plastic article recited in claim 7 wherein said predetermined volume (%) of said magnesium oxide nanoparticles dispersed in said photoresist host material is about 40% to 50%.

9. A method of manufacturing a photoresist nanocomposite optical plastic article, comprising the steps of:
   (a) providing a photoresist host material having a temperature sensitive optical vector $x_1$ and substantially transparent inorganic nanoparticles having a temperature sensitive optical vector $x_2$, wherein said temperature sensitive optical vector $x_1$ is directionally opposed to said temperature sensitive optical vector $x_2$;
   (b) dispersing said substantially transparent inorganic nanoparticles into said photoresist host material forming a photoresist nanocomposite material; and,
   (c) forming said photoresist nanocomposite material into said photoresist optical plastic article.

* * * * *